Jan. 8, 1935.  A. M. GRÖNNINGSÆTER  1,986,967
PROCESS OF TREATING NICKEL COPPER SOLUTION
TO REMOVE IRON PRESENT THEREIN
Filed Oct. 8, 1930
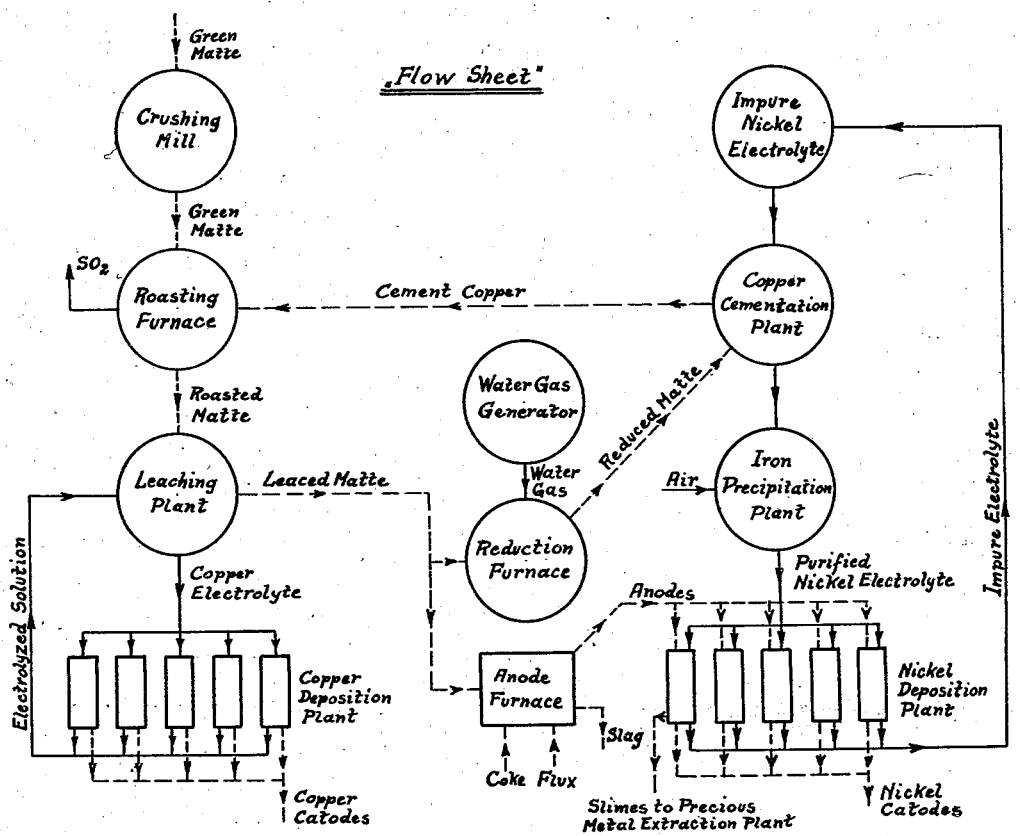
INVENTOR
Anton Martin Gronningsaeter
BY
ATTORNEYS Patented Jan. 8, 1935

1,986,967

UNITED STATES PATENT OFFICE 1,986,967

PROCESS OF TREATING NICKEL-COPPER SOLUTION TO REMOVE IRON PRESENT THEREIN

Anton Martin Grönningsæter, Minneapolis, Minn., assignor to Falconbridge Nickel Mines Limited, Toronto, Ontario, Canada Application October 8, 1930, Serial No. 487,369
In Norway May 22, 1930

6 Claims. (Cl. 204—15)

This invention relates to the recovery of nickel and other metals from solutions containing in addition to the metal or metals to be recovered also iron, and the invention has for its object a process whereby it is made possible by simple means to effect a sufficiently thorough removal of the iron to make possible a subsequent electrolytical deposition of nickel of a satisfactory degree of purity.

An important feature of this process is that the precipitation of iron by oxidation (and hydrolysis) is carried into effect directly after a previous treatment of the solution with metallic nickel of special character as obtained by low temperature reduction.

It is known, that iron can be precipitated from solutions of its salts by hydrolysis under certain conditions without introducing solid or liquid precipitation agents into the solutions. In nearly neutral solutions the iron can be entirely or in part precipitated by oxidation. The completeness of the precipitation is in this case dependent upon the amount of iron present, the acidity (pH) and temperature of the solution and the character of the oxidation agent employed. The precipitation is aided by low acidity (high pH) and increased temperature. It is desirable to use for oxidation air, which is cheap and leaves no salts accumulating in the solution. Increasing the temperature above the normal temperature of the solution, viz. the temperature, which the solution will naturally have under the prevailing conditions, is not desirable, on account of the expense involved in the heating and possible subsequent artificial cooling, and for a number of other reasons, such as variations in the strength of an electrolyte, influence on equipment, disadvantage of steam in the working room etc.

The present invention is based on the observation that it is possible to direct operations in such a way, that iron in the amounts generally present in the solutions to be treated can be precipitated practically completely by blowing air into the solution at its normal temperature. This is accomplished by neutralizing the solution sufficiently before introducing the air, and in case of solutions containing copper, such neutralization is preferably and most easily effected by using for cementation of copper a finely divided nickel produced by reduction with gas (for instance water-gas) at low temperature. This nickel material is at the same time extremely active in reducing the free acid in the electrolyte, and it has in practice been found very easy to reduce the iron in the solution so neutralized to the merest trace by this process without heating the solution either for cementation or iron precipitation.

It has previously been proposed (U. S. A. Patent No. 1,382,361 to Hybinette and Peek) in connection with the recovery of nickel by electrolysis to effect the desired removal of copper present in the solution at the normal temperature of the solution by cementation on materials containing finely divided metallic nickel. According to this known process there is, however, retained in the electrolyte after the cementation treatment a certain degree of acidity, considered desirable in the operation of the cyclic process; from such acid solution it is not possible to obtain the result which is the object of the present invention: an easy removal of almost all of the iron present. The degree of acidity which is to be maintained in the solution according to the process above mentioned can only be attained by the use of a nickel material of a relatively low reactivity for cementation of the copper.

According to the present invention a strongly reactive nickel material is used. Such strongly reactive material is obtained by gas reduction at a temperature, which is only slightly higher than that which is theoretically necessary to effect reduction. In this connection it is of importance to mention the well-known fact that the reactivity of the nickel varies very greatly with the temperature used in the reduction process.

As above mentioned the treatment of the solution with highly reactive nickel material is according to the present invention followed by an oxidation treatment to precipitate the iron present. When a cementation material of the specified material is used there is obtained not only a complete removal of the copper but as explained also such a thorough neutralization of the solution so treated as to permit a satisfactorily complete precipitation of the iron of being effected by blowing air into the solution at its normal temperature which in most instances will be below 60° C.

While, according to Patent 1,382,361, a certain acidity is desired and maintained for the cyclic operation of the process, the process I use is quite different. I operate with an almost neutral solution, with a pH as obtained after precipitation of the iron as mentioned above; at the most only a very slight adjustment is needed.

The described process is generally applicable in all instances where it is desirable to remove iron from solutions containing nickel, but the process may be used with particular advantage in connection with the refining of copper nickel materials according to the well known Hybinette process as described in a number of prior patent specifications (for example U. S. A. Patents Nos. 805,969, 1,128,313 and 1,382,361) according to which the treatment is carried out as a cyclic process.

When the invention is made use of in connection with the refining of copper-nickel matte the process may for example be carried out as follows:

The nickel-copper material is ground fine, roasted for removal of sulphur, and leached for partial removal of copper. Part of the leached residue is reduced by gas at a low temperature—for instance about 350–450°—to a metallic powder to be used for cementation of copper and neutralization of acid. The remainder, which may be dissolved and refined in several ways, is preferably converted into metal and cast into anodes, containing nickel and some copper and iron. These anodes are dissolved in an electrolytic cell, which is divided in an anode—and a cathode compartment. The solution escaping from the anode compartment of the cell will, besides nickel, contain some copper and iron, and will as a rule also contain some free acid. This solution has a temperature which generally is not much above or below 50° C. The solution is without heating brought in contact with an excess of the metallic powder above referred to, preferably using the counter current principle, the copper cemented out and the acid neutralized. Without heating the solution the iron is thereupon precipitated by blowing air through the liquid, and the solution of nickel now practically free from copper and iron is returned to the cathode compartment, generally even without any need for adjustment of the pH of the solution.

The metals may be present as sulphates or chlorides or as a mixture of both and the solution may generally with advantage contain substances acting as buffers, such as for example boric acid.

In its more comprehensive aspect, as above noted, the process of the present invention is of more general application; but the invention is of particular value when combined in a cyclic process in the manner above described. Accordingly, I wish to be understood as claiming the invention in its more comprehensive aspects, as well as in its more specific aspects when combined with a cyclic electrolytic process in the manner above described.

A flow sheet is attached hereto that diagrammatically illustrates a practice of the present invention. It is self-explanatory, and will require no further comment at this place.

I claim:

1. In a process of treating an acidic nickel-copper solution containing an objectionable amount of iron in solution, the steps which comprise subjecting the acidic nickel-copper solution to the neutralizing and copper cementing action of finely divided highly reactive metallic nickel obtained by gas-reduction at a temperature only slightly above that required to effect reduction, said highly reactive nickel being sufficient in amount and reactivity without the introduction of any other neutralizing agent to effect substantial neutralization of the solution, and then subjecting the neutralized solution to aeration to effect precipitation of substantially all of the objectionable iron by oxidation and hydrolysis.

2. Process according to claim 1, in which the neutralizing and the oxidizing actions are made to take place while the solution is maintained at a temperature below 60° C.

3. Process according to claim 1, in which the purified nickel electrolyte is conducted to the cathode compartment of an electrolytic cell wherein the nickel is deposited, passing the electrolyte through a filter to the anode compartment of the cell, dissolving nickel, copper and a small amount of contaminating iron from a nickel-copper anode in said cell to obtain an acidic nickel-copper electrolyte, and then treating the resulting impure acidic nickel-copper solution as aforesaid.

4. Process according to claim 1, in which the highly reactive nickel is obtained by roasting and leaching disintegrated bessemerized nickel-copper matte, and then reducing part of the roasted and leached material by a gaseous reduction agent at a temperature not substantially higher than that required to effect reduction of the nickel compounds present in the material.

5. Process according to claim 1, in which the highly reactive nickel is obtained by gas reduction of nickel compounds at a temperature which does not rise substantially above 450° C.

6. In the process of treating acidic nickel solution containing an objectionable amount of iron in solution, the step which comprises subjecting the acidic nickel solution to the neutralizing action of finely divided highly reactive nickel, obtained by gas-reduction at a temperature only slightly above that required to effect reduction, said finely divided nickel being sufficient in amount and reactivity without the introduction of any other neutralizing agent to give the nickel solution a pH value at which the solution may be subjected to aeration to effect precipitation of substantially all of the objectionable iron by oxidation and hydrolysis.

ANTON MARTIN GRÖNNINGSÆTER.